US012352873B2

(12) United States Patent
Mclaughlin et al.

(10) Patent No.: US 12,352,873 B2
(45) Date of Patent: Jul. 8, 2025

(54) METHOD AND APPARATUS FOR DETERMINING THE ANGLE OF DEPARTURE

(71) Applicant: DecaWave, Ltd., Dublin (IE)

(72) Inventors: Michael Mclaughlin, Dublin (IE); Jaroslaw Niewczas, Jozefow (PL); Igor Dotlic, Dublin (IE); Billy Verso, Maynooth (IE)

(73) Assignee: DecaWave, Ltd., Dublin (IE)

( * ) Notice: Subject to any disclaimer, the term of this patent is extended or adjusted under 35 U.S.C. 154(b) by 0 days.

(21) Appl. No.: 18/421,173

(22) Filed: Jan. 24, 2024

(65) Prior Publication Data
US 2024/0168119 A1    May 23, 2024

Related U.S. Application Data

(63) Continuation of application No. 17/892,818, filed on Aug. 22, 2022, now abandoned, which is a continuation of application No. 16/903,500, filed on Jun. 17, 2020, now Pat. No. 11,422,220.

(51) Int. Cl.
G01S 3/48    (2006.01)
G01S 3/04    (2006.01)
H04B 7/08    (2006.01)

(52) U.S. Cl.
CPC .............. G01S 3/48 (2013.01); G01S 3/043 (2013.01); H04B 7/086 (2013.01)

(58) Field of Classification Search
CPC ............ G01S 3/48; G01S 3/043; H04B 7/086
USPC ....... 367/125; 455/456.1; 375/362; 370/329; 342/423
See application file for complete search history.

(56) References Cited

U.S. PATENT DOCUMENTS

| 4,422,076 | A  | 12/1983 | Tricoles et al. |
| 4,626,860 | A  | 12/1986 | Tricoles et al. |
| 4,734,702 | A  | 3/1988  | Kaplan |
| 6,233,459 | B1 | 5/2001  | Sullivan et al. |
| 6,317,611 | B1 | 11/2001 | Kobayakawa |

(Continued)

FOREIGN PATENT DOCUMENTS

| CN | 104484852 A    | 4/2015  |
| WO | 2015051821 A1  | 4/2015  |
| WO | 2015176776 A1  | 11/2015 |

OTHER PUBLICATIONS

Alexander, S.N., "Soviet Computer Technology—1959," Communications of the ACM, vol. 3, Issue 3, Mar. 1960, pp. 131-166.

(Continued)

Primary Examiner — Bo Fan
(74) Attorney, Agent, or Firm — Withrow & Terranova, P.L.L.C.

(57) ABSTRACT

An ultra-wideband (UWB) communication system comprising a transmitter having two antennas and a receiver having a single receive antenna. Respective selected portions of the UWB signal are transmitted by the transmitter via each of the two transmit antennas and are received at the receive antenna. By comparing the phases of the received signal portions, the phase difference of departure can be determined. From this phase difference the known distance, d, between the transmit antennas the Cartesian (x, y) location of the transmitter relative to the receiver can be directly determined.

20 Claims, 4 Drawing Sheets

(56) References Cited

U.S. PATENT DOCUMENTS

| | | | |
|---|---|---|---|
| 7,349,461 | B2 | 3/2008 | Glazko et al. |
| 7,636,397 | B2 | 12/2009 | McLaughlin |
| 7,787,544 | B2 | 8/2010 | McLaughlin |
| 8,358,709 | B2 | 1/2013 | McLaughlin |
| 8,677,224 | B2 | 3/2014 | McLaughlin et al. |
| 8,693,286 | B1 | 4/2014 | Rogers et al. |
| 9,778,340 | B2 | 10/2017 | Mutz et al. |
| 10,056,993 | B2 | 8/2018 | Clancy et al. |
| 10,509,116 | B2 | 12/2019 | McLaughlin et al. |
| 2007/0085715 | A1 | 4/2007 | McLaughlin |
| 2007/0140323 | A1 | 6/2007 | Patel et al. |
| 2007/0159924 | A1 | 7/2007 | Vook et al. |
| 2008/0112440 | A1 | 5/2008 | Bedekar et al. |
| 2009/0243932 | A1 | 10/2009 | Moshfeghi |
| 2009/0310444 | A1* | 12/2009 | Hiroe ............... G01S 3/8006 367/125 |
| 2009/0316529 | A1 | 12/2009 | Huuskonen et al. |
| 2010/0087151 | A1 | 4/2010 | Auer |
| 2010/0097270 | A1 | 4/2010 | Fukada |
| 2012/0276921 | A1* | 11/2012 | Nemeth ............... G01S 3/043 455/456.1 |
| 2013/0163638 | A1 | 6/2013 | McLaughlin et al. |
| 2014/0093023 | A1* | 4/2014 | Park ............... G01S 3/18 375/362 |
| 2014/0204977 | A1 | 7/2014 | Morche |
| 2016/0254889 | A1* | 9/2016 | Shattil ............... H04L 5/0035 370/329 |
| 2016/0259033 | A1 | 9/2016 | Madimirov et al. |
| 2017/0085293 | A1 | 3/2017 | Marrow et al. |
| 2019/0204432 | A1 | 7/2019 | Safaripour et al. |
| 2019/0289568 | A1 | 9/2019 | Pajovic et al. |
| 2019/0331781 | A1* | 10/2019 | McLaughlin ....... G01S 13/0209 |
| 2019/0331782 | A1 | 10/2019 | McLaughlin et al. |
| 2019/0331783 | A1 | 10/2019 | McLaughlin et al. |
| 2020/0252101 | A1 | 8/2020 | McLaughlin et al. |
| 2020/0334394 | A1 | 10/2020 | Wodrich et al. |
| 2021/0396832 | A1 | 12/2021 | McLaughlin et al. |

OTHER PUBLICATIONS

Carr, J.W. et al., "A Visit to Computation Centers in the Soviet Union," Communications of the ACM, vol. 2, Issue 6, Jun. 1959, pp. 8-20.
Loeffler, A., "Localizing with Passive UHF RFID Tags Using Wideband Signals," IEEE International Conference on Microwaves, Communications, Antennas and Electronics Systems (COMCAS), Nov. 7-9, 2011, Tel Aviv, Israel, IEEE, 6 pages.
Manteuffel, D. et al., "Antenna and Propagation impairments of a UWB localization system integrated into an aircraft cabin," 2010 Loughborough Antennas & Propagation Conference, Nov. 8-9, 2010, Loughborough, UK, IEEE, pp. 589-592.
Song, "A Low Complexity Asynchronous UWB TDOA Localization Method," International Journal of Distributed Sensor Networks, vol. 2015, Article IDS 675490, Oct. 2015, Hindawi Publishing Corporation, 11 pages.
Wang, Z. et al., "A New Multi-Antenna Based LOS-NLOS Separation Technique," 2009 IEEE 13th Digital Signal Processing Workshop and 5th IEEE Signal Processing Education Workshop, Jan. 4-7, 2009, Marco Island, FL, IEEE, pp. 331-336.

Non-Final Office Action for U.S. Appl. No. 15/375,739, filed Jun. 9, 2017, 12 pages.
Final Office Action for U.S. Appl. No. 15/375,739, filed Nov. 9, 2017, 14 pages.
Applicant-Initiated Interview Summary for U.S. Appl. No. 15/375,739, filed Mar. 1, 2018, 3 pages.
Notice of Allowance for U.S. Appl. No. 15/375,739, filed Jul. 17, 2018, 10 pages.
Non-Final Office Action for U.S. Appl. No. 15/974,412, filed Apr. 25, 2019, 9 pages.
Notice of Allowance for U.S. Appl. No. 15/974,412, filed Oct. 23, 2019, 8 pages.
Non-Final Office Action for U.S. Appl. No. 16/352,105, filed Aug. 25, 2020, 11 pages.
Final Office Action for U.S. Appl. No. 16/352,105, filed Feb. 5, 2021, 13 pages.
Non-Final Office Action for U.S. Appl. No. 16/352,372, filed Oct. 9, 2020, 13 pages.
Final Office Action for U.S. Appl. No. 16/352,372, filed Feb. 5, 2021, 15 pages.
International Search Report and Written Opinion for International Patent Application No. PCT/EP2013/070851, mailed Jun. 4, 2014, 13 pages.
International Preliminary Report on Patentability for International Patent Application No. PCT/EP2013/070851, mailed Apr. 21, 2016, 10 pages.
International Search Report and Written Opinion for International Patent Application No. PCT/EP2014/060722, mailed Jan. 28, 2015, 10 pages.
International Preliminary Report on Patentability for International Patent Application No. PCT/EP2014/060722, mailed Dec. 8, 2016, 8 pages.
Non-Final Office Action for U.S. Appl. No. 16/780,004, filed Aug. 26, 2020, 9 pages.
Notice of Allowance for U.S. Appl. No. 16/780,004, filed Dec. 28, 2020, 8 pages.
Advisory Action for U.S. Appl. No. 16/352,105, filed May 10, 2021, 3 pages.
Advisory Action for U.S. Appl. No. 16/352,372, filed May 19, 2021, 3 pages.
Notice of Allowance for U.S. Appl. No. 16/352,480, filed Apr. 21, 2021, 8 pages.
Notice of Allowance for U.S. Appl. No. 16/780,004, filed May 27, 2021, 17 pages.
Non-Final Office Action for U.S. Appl. No. 16/352,105, filed Jul. 26, 2021, 10 pages.
Final Office Action for U.S. Appl. No. 16/352,105, filed Jan. 18, 2022, 13 pages.
Non-Final Office Action for U.S. Appl. No. 16/352,372, filed Sep. 3, 2021, 12 pages.
Final Office Action for U.S. Appl. No. 16/352,372, filed Apr. 6, 2022, 12 pages.
Corrected Notice of Allowability for U.S. Appl. No. 16/352,480, filed Dec. 9, 2021, 6 pages.
Non-Final Office Action for U.S. Appl. No. 16/903,500, filed Dec. 3, 2021, 8 pages.
Notice of Allowance for U.S. Appl. No. 16/903,500, filed Apr. 19, 2022, 8 pages.
Notice of Allowance for U.S. Appl. No. 17/892,818, filed Oct. 31, 2023, 8 pages.

* cited by examiner

METHOD AND APPARATUS FOR DETERMINING THE ANGLE OF DEPARTURE

RELATED APPLICATIONS

This application is a continuation of U.S. patent application Ser. No. 17/892,818, filed Aug. 22, 2022, which is a continuation of U.S. patent application Ser. No. 16/903,500, filed Jun. 17, 2020, now U.S. Pat. No. 11,422,220, the disclosures of which are hereby incorporated herein by reference in their entireties.

This application is related to provisional patent application Ser. No. 62/800,468, filed Feb. 2, 2019.

This application is also related to U.S. Pat. No. 10,509,116, issued Dec. 17, 2019, and U.S. Pat. No. 10,056,993, issued Aug. 21, 2018.

FIELD OF THE DISCLOSURE

The present invention relates generally to ultra-wideband communication systems, and, in particular, to a receiver for use in an ultra-wideband communication system adapted to determine the angle of departure of an RF signal transmitted by an RF transmitter.

BACKGROUND

In general, in the descriptions that follow, we will italicize the first occurrence of each special term of art which should be familiar to those skilled in the art of ultra wideband (UWB) communication systems. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status hit, or similar apparatus into its logically true or logically false state, respectively, and the term toggle to indicate the logical inversion of a signal from one logical state to the other. Alternatively, we may refer to the mutually exclusive boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

In prior art systems that calculate angle of arrival (AoA), such as those referenced in the First Related Patent, there are two or more receive antennas and one transmit antenna. A transmitter transmits an RF signal, e.g., a channel sounding signal, using the single transmit antenna. The receiver receives a portion of the transmitted signal via its first receive antenna. It then switches to receive another portion of the transmitted signal from the second receive antenna. It may thereafter continue to do so using any remaining receive antennas. The receiver can now calculate a phase from each of the signal portions received from each of the several receive antennas as a function of the complex baseband impulse response (CIR) of the channel. These phases are then used to calculate the phase differences of arrival between one or more pairs of receive antennas. This phase difference of arrival can be used to calculate an angle of arrival. Alternatively, the phase difference of arrival can be used, in conjunction with a range, directly to calculate the (x, y) cartesian position of the transmit antenna with respect to the receive antennas.

In all of the prior art of AoA systems known to us, either: a.) each receiver must be provided with multiple, switchable receive antennas, or b.) each receiver must, in fact, comprise multiple, cooperating receivers, each having a respective antenna. However, in general, modern RF communication devices, e.g. cell phones, have only a single antenna, and to add a second would significantly increase the cost and computational complexity.

In some applications, UWB signals are forbidden from being transmitted by fixed installations, but are allowed to be transmitted by mobile devices and are allowed to be received by fixed installation. In such applications, prior art AoA approaches simply will not work.

What is needed is a method and apparatus for use in an RF receiver for determining the angle of departure (AoD) of an RF signal transmitted by an RF transmitter. In particular, we submit that such a method and apparatus should provide performance generally comparable to the best prior art techniques but more efficiently than known implementation of such prior art techniques.

SUMMARY

In accordance with one embodiment of our invention, we provide a method for use in a UWB communication system comprising a UWB transmitter and a UWB receiver. In particular, by way of example, the transmitter has first and second transmit antennae separated by a distance, d, and the receiver has a single receive antenna. In accordance with our method, we first transmit a selected first portion of the signal using the first transmit antenna and, upon receiving the transmitted first portion of the signal via the receive antenna, we develop a first phase value of the received first portion of the signal. Second, we transmit a selected second portion of the signal using the second transmit antenna and, upon receiving the transmitted second portion of the signal via the receive antenna, we develop a second phase value of the received second portion of the signal. Next, we develop a path difference value, p, as a function of the first and second phase values. Finally, we correct p as a function of mutual coupling of the first and second transmit antennas.

In one other enhanced embodiment, we determine a distance r between the receive antenna and a mid-point between the first transmit antenna and the second transmit antenna and then develop an (x, y) Cartesian position of the transmitter relative to the receive as a function of d, r, and p.

In one enhanced embodiment, we develop an angle of departure of the signal transmitted by the transmitter relative to the receiver as a function of d, r, and p.

In one other embodiment, we provide an angle of departure circuit configured to perform our method for determining the angle of departure.

In another embodiment, we provide an RF receiver comprising an AoD circuit configured to perform our method for determining the angle of departure.

In yet another embodiment, we provide an RF transceiver comprising an RF receiver comprising an AoD circuit configured to perform our method for determining the angle of departure.

In still another embodiment, we provide an RF communication system comprising an RF transceiver comprising an RF receiver comprising an AoD circuit configured to perform our method for determining the angle of departure.

The methods of our invention may be embodied in non-transitory computer readable code on a suitable computer readable medium such that when a processor executes the computer readable code, the processor executes the respective method.

BRIEF DESCRIPTION OF THE DRAWING FIGURES

Our invention may be more fully understood by a description of certain preferred embodiments in conjunction with the attached drawings in which.

Figure 1:
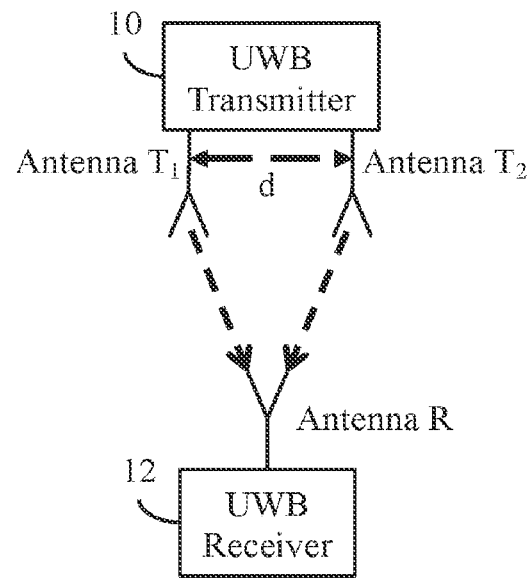
FIG. 1 illustrates, generally, in a topographic perspective, an RF communication system and, in particular, the different angles of incidence of two RF signals transmitted by respective transmit antennas spaced a distance, d, apart, as received by a single receive antenna.
Figure 2:
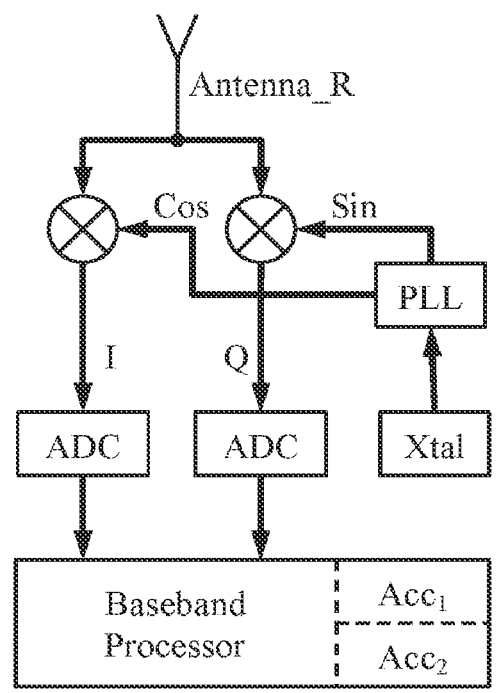
FIG. 2 illustrates, in a block diagram form, the RF receiver 12 of FIG. 1.
Figure 3:
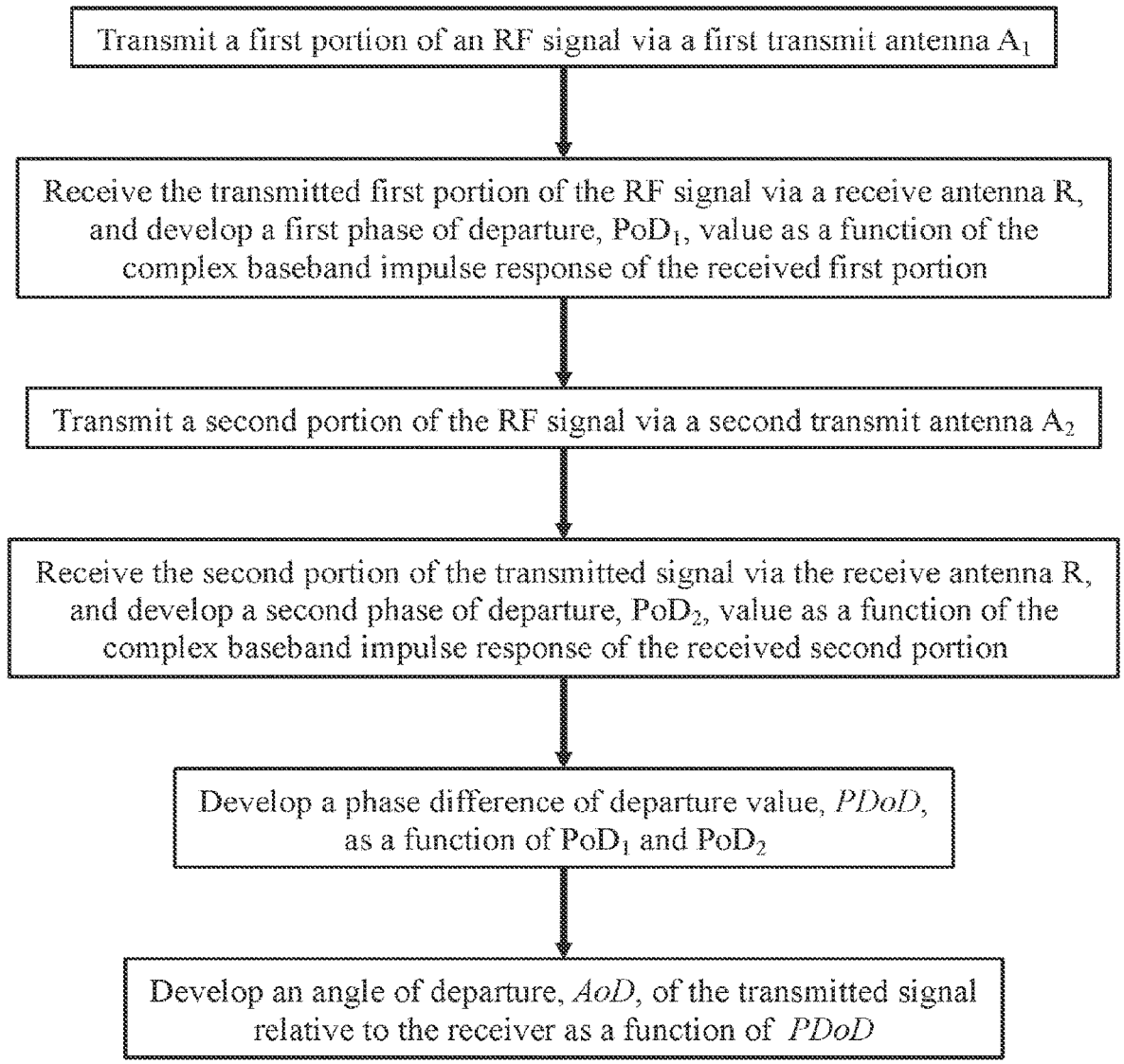
FIG. 3 illustrates, in a flow diagram form, one embodiment of our invention to determine the AoD of an RF signal transmitted by a multi-antenna transmitter to a single-antenna receiver.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION

As illustrated in FIG. 1, the transmitter 10 would have two transmit antennas, antenna $T_1$ and antenna $T_2$, and be configured to transmit a first portion of a channel sounding signal via antenna $T_1$ and a second portion of the channel sounding signal via antenna $T_2$. The receiver 12, which has only a single receive antenna, Antenna_R, comprises two accumulators, $Acc_1$ and $Acc_2$, and is configured to accumulate, into $Acc_1$, a correlation of the first portion of the signal transmitted by antenna $T_1$, and then accumulate into $Acc_2$ a correlation of the second portion of the transmitted signal transmitted via antenna $T_2$.

As is well known in this art, each of the accumulated correlations comprise respective channel impulse response estimates. From each such estimate, a respective phase of departure (POD) can be calculated using known techniques. A phase difference of departure (PDOD) can then be calculated as a function of the difference between the PoDs of each selected transmit antenna pair. The AoD can now be calculated as a function of the PDoD. In one embodiment, if the distance between the transmitter 10 and the receiver 12 is known, a priori, the PDoD can be used to calculate the (x, y) Cartesian position of the transmit antennas.

Figure 4:
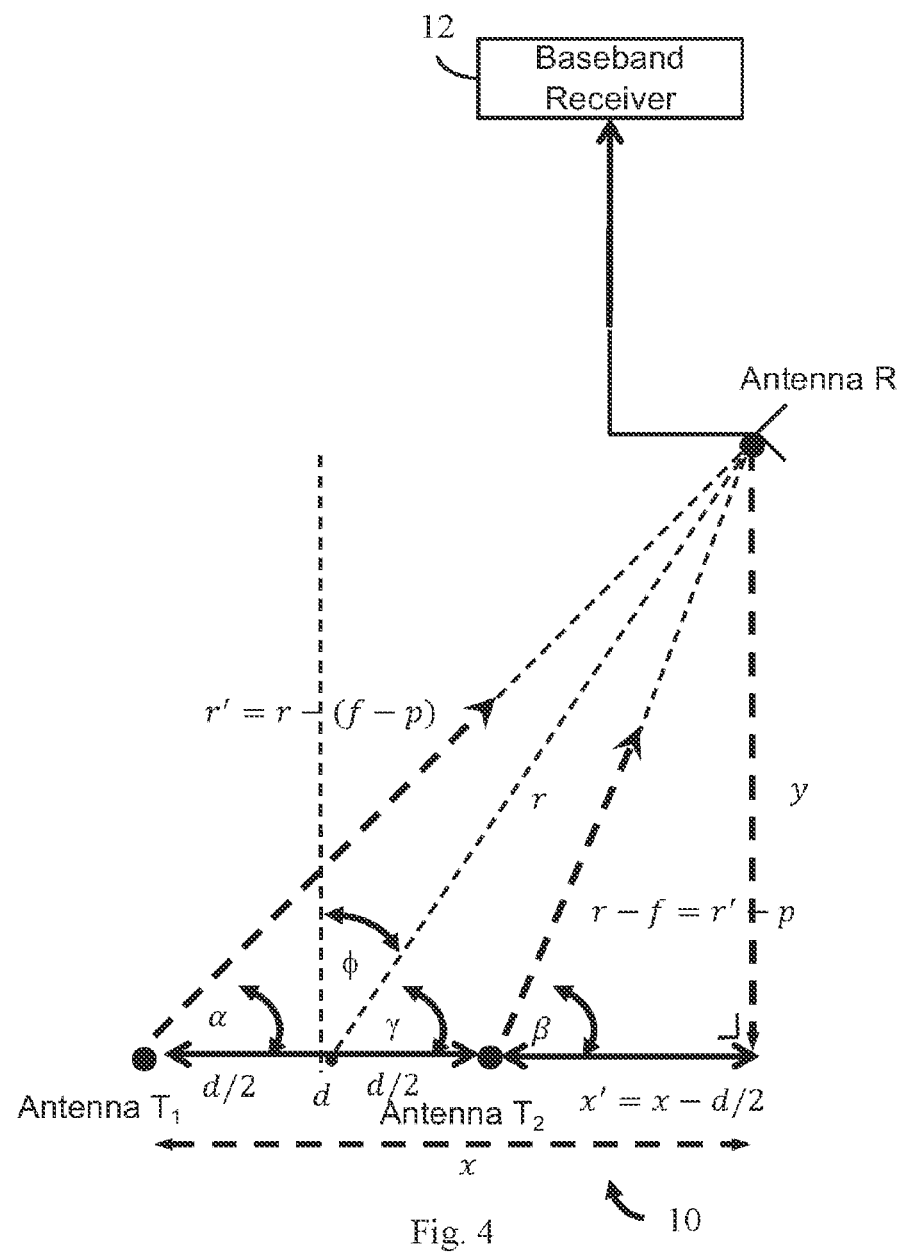
FIG. 4 illustrates, in a topographic perspective, one geometric embodiment of the communication of FIG. 1.

In the scenario shown in FIG. 4, the distance between receive Antenna_R and the mid-point of the transmit Antenna $T_1$ and the transmit Antenna $T_2$ is r. The angle of departure from Antenna $T_1$ is $\alpha$, the angle of departure from Antenna $T_2$ is $\beta$, and the angle of departure from the mid-point between Antenna $T_1$ and Antenna $T_2$ is y. The quantity y is the angle of departure. The signal traveling from Antenna $T_1$ to Antenna_R travels a slightly different distance from the signal traveling from Antenna $T_2$ to Antenna R. We will call that path difference p.

We can use well known methods to find the distance r between Antenna_R and the mid-point between Antenna $T_1$ and Antenna $T_2$, e.g. by determining the time of flight of a signal transmitted from the transmitter 10 to the receiver 12.

Provided that the distance d between two transmit antennas is less than or equal to one-half wavelength ($\lambda$) of the radio signals received by Antenna_R, the path difference p will always be somewhere between $-\lambda/2$ and $+\lambda/2$.

So, if we can measure the phase of arrival at Antenna_R of each of the signals transmitted by Antenna $T_1$ and Antenna $T_2$, the phase difference going from $-180°$ to $+180°$ can give us a path difference varying from $-\lambda/2$ to $+\lambda/2$. We wish to find the (x, y) Cartesian location of the transmitter 10 with respect to the receiver 12. So, we can use known methods to find the distances x and y.

Using the cosine rule:

$$\cos(A) = \frac{b^2 + c^2 - a^2}{2bc} \text{ and,}$$

let $A = \lambda$, $a = r - f$, $b = r$, and $c = d/2$ $$\cos(\gamma) = \frac{x}{r} = \frac{r^2 + \frac{d^2}{4} = r^2 + 2rf - f^2}{rd}$$

$$x = \frac{d^2 + 8rf - 4f^2}{4d} \quad [\text{Eq. 1}]$$

[Eq. 2]

$$x = \frac{2rf}{d} - \frac{f^2}{d} + \frac{d}{4} \quad (1a)$$

Using the cosine rule again:

$$\cos(A) = \frac{b^2 + c^2 - a^1}{2bc} \text{ and,}$$

let $A = \lambda$, $a = r - f$, $b = r$, and $c = d/2$ $$\cos(\alpha) = \frac{r'^2 + d^2 - (r-p)^2}{2rd}$$

$$\frac{x'}{r'} = \frac{r'^2 + d^2 - r'^2 + 2r'p - p^2}{2r'd}$$

$$x' = \frac{d^2 + 2r'p - p^2}{2d} \quad [\text{Eq. 3}]$$

$$x' = \left(r' - \frac{p}{2}\right)\frac{p}{d} + \frac{d}{2} \quad [\text{Eq. 4}]$$

From [Eq. 4], substituting x' and $$r'x = \left(r + p - f - \frac{p}{2}\right)\frac{p}{d}$$

$$\frac{xd}{p} = r + p - f - \frac{p}{2}$$

Substitute f into [Eq. 2]:

$$x = (2r\frac{\left(r - \frac{xd}{p} + \frac{p}{2}\right)}{d} - \frac{\left(r - \frac{xd}{p} + \frac{p}{2}\right)^2}{d + d/4}$$

Solving for x gives:

$$x = \frac{p\sqrt{4r^2 + d^2 - p^2}}{2d} \quad [\text{Eq. 5}]$$

$$y = \pm\sqrt{r^2 - x^2} \quad [\text{Eq. 6}]$$

Alternatively, substituting x gives:

$$y = \frac{\sqrt{-d^2 p^2 + 4d^2 r^2 + p^4 - 4p^2 r^2}}{2d} \text{ and,}$$

$p^4$ and $d^2 p^2 \ll 4d^2 r^2$ $$y \approx \frac{\sqrt{4d^2 r^2 - 4p^2 r^2}}{2d}$$

$$y \approx r\sqrt{1 - \frac{p^2}{d^2}} \quad [\text{Eq. 7}]$$

$$x = \frac{p\sqrt{4r^2 + d^2 - p^2}}{2d} \quad [\text{Eq. 8}]$$

$$x \approx r\frac{p}{d} \quad [\text{Eq. 9}]$$

We can also find the angle of departure, y, as:

$$y = \tan^{-1}\left(\frac{y}{x}\right) = \tan^{-1}\left(\frac{d}{p}\sqrt{1 - \frac{p^2}{d^2}}\right) = \tan^{-1}\left(\sqrt{\frac{d^2}{p^2} - 1}\right) \quad [\text{Eq. 10}]$$

So, using either [Eq. 5] and [Eq. 6] or [Eq. 7] and [Eq. 8], we have calculated the (x, y) Cartesian position of the transmitter 10 relative to the receiver 12, and the angle of departure, y. We just need to know:

r—the range from the receive antenna to the mid-point of the transmit antennas;
d—the distance between the two transmit antennas; and
p—the path difference for the signals arriving at the receive antenna.

One of the most accurate ways to get the path difference is to get the phase difference of departure of a signal in fractions of a cycle, and then multiple by the wavelength of the carrier:

$$p = \lambda * \left(\frac{\phi}{2\pi}\right) \quad [\text{Eq. 11}]$$

where ⊖ is the phase difference expressed in radians.

Another way is to get the time difference of arrival of a signal and multiply by the speed of light. A third way is to get the difference in the time of flight and then multiply by the speed of light.

Figure 5:
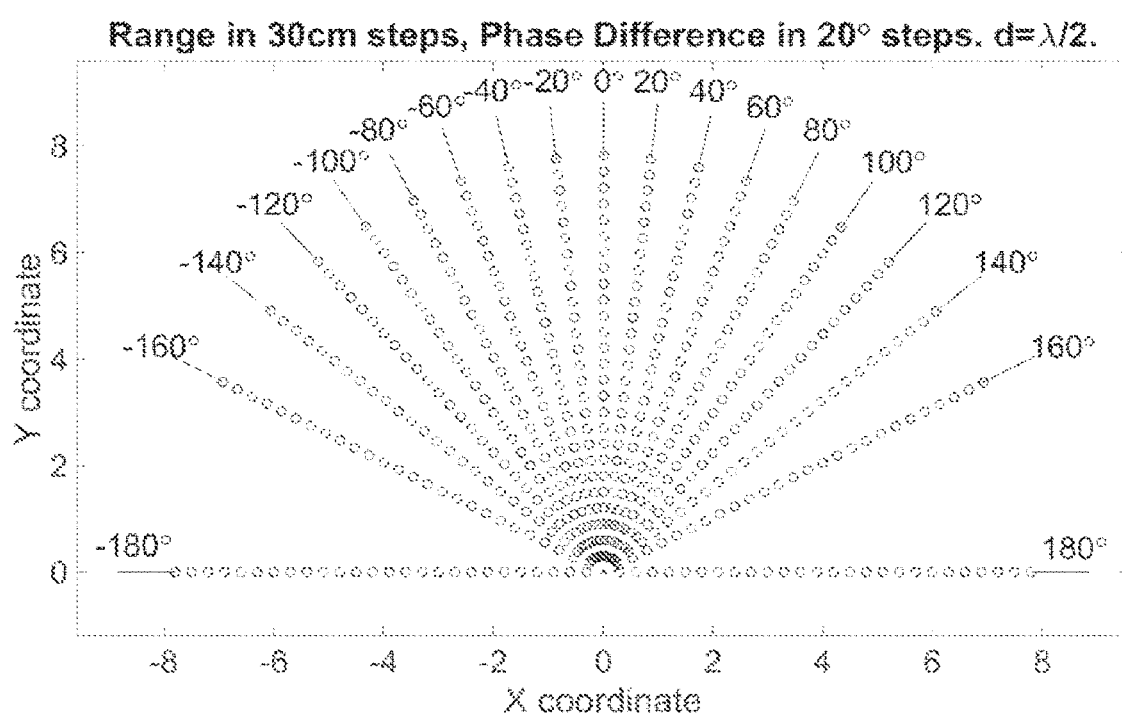
FIG. 5 illustrates, in a chart form, the relationship between range and phase difference for an antenna separation of $\lambda/2$ using a single carrier.

We can see from FIG. 5 that the position uncertainty at phase differences near +/−180 is quite large. A very small change in phase gives a large change in the y position. We can see this sensitivity in [Eq. 10], which contains a $$\left(1 - \left(\frac{p}{d}\right)^2\right)$$

term under the radical.

Let us consider why it is useful to determine the angle of departure from the perspective of the transmitter rather than the traditional angle of arrival from the perspective of the receiver:

1. Multiple receivers can calculate the angle (and, hence, the position) from a single transmitted signal (or groups of transmitted packets) sent by one central device;
2. AoD could be useful in inverse time difference of arrival (TDoA) schemes (which could also be called TDoD), which would now become inverse TDoA hybrid with inverse PDoA, i.e., phase difference of departure (PDoD);
3. In inverse TDOA, anchors only transmit and tags only receive and calculate their positions from TDoA. The advantage of our method is having a practically unlimited number tags, and the fact that tags don't need to synchronize their transmission in the MAC sense. In other words, the traffic does not get more complex with an increasing number of tags;
4. System performance would be improved, or the number of anchors needed would be reduced by implementing AoD (PDoD);
5. If an anchor (with 2 transmit antenna) initiates a wireless communication, there would be no need to have a $3^{rd}$/final message to get the phase difference information back to the tag, thus reducing airtime (power/density);
6. If the height of the devices are known (like a robot in a factory or house), navigation could be delivered to an unlimited number of devices using a reverse TDoA/PDoA combination with a single anchor (which would need 4 transmit antenna);
7. If the tag knows, a priori, the positions of three anchors and its own height relative to the anchor height, all it needs to calculate its own position is the angle at which the signal came in from each anchor (which can be calculated from the AoD); and
8. As has been noted above, in some applications, UWB signals are forbidden from being transmitted by fixed installations but are allowed to be transmitted by mobile devices and are allowed to be received by fixed installations. In these cases, the mobile device can have two or more antennas and can transmit a UWB signal of the type described in this specification. The fixed installations can receive this special signal and calculate the angle to the mobile devices. The position of the mobile device can then be calculated from a number of these AoDs and the position of the installations that received them.

Adjusting Path Difference for Antenna Effects:

In a real system, when the two transmit antenna are closer than a few wavelengths apart, the transmit antennas interact through an effect known as mutual coupling. This causes the electromagnetic waves to behave differently than they would in free space, which, in turn, causes the effective path difference to be different than the geometric path difference.

Another effect seen in the real world is that the feed wires to the transmit antennas can have slightly difference lengths or the paths from the down-mixer generator to the two separate down-mixers can have slightly different delays. These two effects, and others, add a constant offset to the path difference. This difference can be quite large in practice, up to +/−half a wavelength.

These effects can be calibrated out of having a conversion function between measured and geometric path differences. For example, let us perform a system calibration task, whereby a number of measurements are taken from a number of different known coordinates with a wide range of geometric path differences. Since we know the true (x, y) Cartesian coordinates, we can calculate this true geometric difference. By measuring the phase difference, we can also calculate the effective or measure path difference. In this way, we can build a calibration function, e.g., by having a look-up table or by using a piecewise linear function or by using a polynomial fitting function.

If using a polynomial fit, the best results may be obtained if the offset at zero degrees is first subtracted from the measured path difference. If the resulting path difference is greater or less than the distance between the transmit antennas, one-half wavelength of the carrier should be added or subtracted to bring the difference back into the range +/−d. We can use this calibration function to correct the path difference, p, before applying the formulas to find the (x, y) Cartesian coordinates. An example of a possible function is shown in FIG. 7.

$$p_g = -0.0222 p_m^4 + 0.0328 p_m^3 + 0.0729 p_m^2 + 0.854 p_m 0.0111$$

Where $p_g$ is the geometric path difference and $p_m$ is the measured path difference, both in centimeters.

Although we have described our invention in the context of particular embodiments, one of ordinary skill in this art will readily realize that many modifications may be made in such embodiments to adapt either to specific implementations. For example, rather than calculating AoD using only a single pair of transmit antennas, additional transmit antennas may be provided, each selectively transmitting a respective portion of the RF signal. Further, the several elements described above may be adapted so as to be operable under either hardware or software control or some combination thereof, as is known in this art. Alternatively, the several methods of our invention as disclosed herein in the context of special purpose receiver apparatus may be embodied in computer readable code on a suitable non-transitory computer readable medium such that, when a general or special purpose computer processor executes the computer readable code, the processer executes the respective method.

Thus, it is apparent that we have provided a method and apparatus for determining the AoD of an RD signal transmitted by a multi-antenna transmitter to a single-antenna receiver. Although we have so far disclosed our invention only in the context of a packet-based UWB communication system, we appreciate that our invention is broadly applicable to other types of wireless communication systems, whether packed-based or otherwise, that perform channel sounding. Further, we submit that our invention provides performance generally comparable to the best prior art techniques but more efficiently than known implementations of such prior are techniques.

What is claimed is:

1. An ultra-wideband (UWB) device, comprising:
a receiver configured to:
receive, from a first antenna of a transmitting device, a selected first portion of a signal; and
receive, from a second antenna of the transmitting device, a second portion of the signal; and
a processor communicatively coupled to the receiver, the processor configured to:
calculate a first phase value as a function of a complex baseband impulse response of the selected first portion of the signal;
calculate a second phase value as a function of a complex baseband impulse response of the second portion of the signal;
calculate a path difference value, p, as a function of the first phase value and the second phase value; and
correct p as a function of a mutual coupling of the first antenna and the second antenna.

2. The UWB device of claim 1, wherein the processor is further configured to:
calculate a first time of flight of the selected first portion of the signal;
calculate a second time of flight of the second portion of the signal; and
calculate a distance, r, between the receiver and a mid-point between the first antenna and the second antenna.

3. The UWB device of claim 2, wherein the first antenna and the second antenna are separated by a distance, d.

4. The UWB device of claim 3, wherein the processor is further configured to calculate a position of the transmitting device relative to the receiver as a function of d and p.

5. A non-transitory computer readable medium storing computer executable instructions, wherein, in response to executing the computer executable instructions, a processor is configured to:
calculate a first phase value as a function of a complex baseband impulse response of a selected first portion of a signal received from a first antenna of a transmitting device;
calculate a second phase value as a function of a complex baseband impulse response of a selected second portion of the signal received from a second antenna of the transmitting device;
calculate a path difference value, p, as a function of the first phase value and the second phase value; and
correct p as a function of a mutual coupling of the first antenna and the second antenna.

6. The non-transitory computer readable medium of claim 5, wherein, in response to executing the computer executable instructions, the processor is further configured to:
calculate a first time of flight of the selected first portion of the signal;
calculate a second time of flight of the selected second portion of the signal; and
calculate a distance, r, between a receiver and a mid-point between the first antenna and the second antenna.

7. The non-transitory computer readable medium of claim 6, wherein the first antenna and the second antenna are separated by a distance d.

8. The non-transitory computer readable medium of claim 7, wherein, in response to executing the computer executable instructions, the processor is further configured to calculate a position of the transmitting device relative to the receiver as a function of d and p.

9. A location determination circuit, comprising:
a receiver configured to:
receive, from a first antenna of a transmitting device, a selected first portion of a signal; and
receive, from a second antenna of the transmitting device, a second portion of the signal; and
a processor communicatively coupled to the receiver, the processor configured to:
calculate a first phase value as a function of a complex baseband impulse response of the selected first portion of the signal;
calculate a second phase value as a function of a complex baseband impulse response of the second portion of the signal;
calculate a path difference value, p, as a function of the first phase value and the second phase value; and correct p as a function of a mutual coupling of the first antenna and the second antenna.

10. The location determination circuit of claim 9, wherein the processor is further configured to:
calculate a first time of flight of the selected first portion of the signal;
calculate a second time of flight of the second portion of the signal; and
calculate a distance, r, between the receiver and a midpoint between the first antenna and the second antenna.

11. The location determination circuit of claim 10, wherein the first antenna and the second antenna are separated by a distance, d.

12. The location determination circuit of claim 11, wherein the processor is further configured to calculate a position of the transmitting device relative to the receiver as a function of d and p.

13. A radio frequency (RF) receiver, comprising:
a receiver configured to:
receive, from a first antenna of a transmitting device, a selected first portion of a signal; and
receive, from a second antenna of the transmitting device, a second portion of the signal; and
a processor communicatively coupled to the receiver, the processor configured to:
calculate a first phase value as a function of a complex baseband impulse response of the selected first portion of the signal;
calculate a second phase value as a function of a complex baseband impulse response of the second portion of the signal;
calculate a path difference value, p, as a function of the first phase value and the second phase value; and
correct p as a function of a mutual coupling of the first antenna and the second antenna.

14. The RF receiver of claim 13, wherein the processor is further configured to:
calculate a first time of flight of the selected first portion of the signal;
calculate a second time of flight of the second portion of the signal; and
calculate a distance, r, between the receiver and a midpoint between the first antenna and the second antenna.

15. The RF receiver of claim 14, wherein the first antenna and the second antenna are separated by a distance, d.

16. The RF receiver of claim 15, wherein the processor is further configured to calculate a position of the transmitting device relative to the receiver as a function of d and p.

17. A radio frequency (RF) communication system, comprising:
a receiver configured to:
receive, from a first antenna of a transmitting device, a selected first portion of a signal; and
receive, from a second antenna of the transmitting device, a second portion of the signal; and
a processor communicatively coupled to the receiver, the processor configured to:
calculate a first phase value as a function of a complex baseband impulse response of the selected first portion of the signal;
calculate a second phase value as a function of a complex baseband impulse response of the second portion of the signal;
calculate a path difference value, p, as a function of the first phase value and the second phase value; and
correct p as a function of a mutual coupling of the first antenna and the second antenna.

18. The RF communication system of claim 17, wherein the processor is further configured to:
calculate a first time of flight of the selected first portion of the signal;
calculate a second time of flight of the second portion of the signal; and
calculate a distance, r, between the receiver and a midpoint between the first antenna and the second antenna.

19. The RF communication system of claim 18, wherein the first antenna and the second antenna are separated by a distance, d.

20. The RF communication system of claim 19, wherein the processor is further configured to calculate a position of the transmitting device relative to the receiver as a function of d and p.

* * * * *